(12) United States Patent
Seki et al.

(10) Patent No.: US 9,991,833 B2
(45) Date of Patent: Jun. 5, 2018

(54) CONTROL DEVICE FOR ROTATING ELECTRIC MACHINE

(71) Applicant: Mitsubishi Electric Corporation, Tokyo (JP)

(72) Inventors: Tomohiro Seki, Tokyo (JP); Masahiro Iezawa, Tokyo (JP); Ryo Nakamura, Tokyo (JP); Yuya Hisano, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days. days.

(21) Appl. No.: 15/253,109

(22) Filed: Aug. 31, 2016

(65) Prior Publication Data
US 2017/0294857 A1    Oct. 12, 2017

(30) Foreign Application Priority Data
Apr. 12, 2016   (JP) ................................. 2016-079280

(51) Int. Cl.
| | | |
|---|---|---|
| H02P 11/00 | (2006.01) | |
| H02H 7/06 | (2006.01) | |
| H02P 9/00 | (2006.01) | |
| H02P 9/30 | (2006.01) | |

(52) U.S. Cl.
CPC ..................................... *H02P 9/30* (2013.01)

(58) Field of Classification Search
USPC .................................................. 322/23, 44
See application file for complete search history.

(56) References Cited

U.S. PATENT DOCUMENTS

| | | | | | |
|---|---|---|---|---|---|
| 5,029,263 | A | * | 7/1991 | Rozman | ................. F02N 11/04 318/400.22 |
| 5,325,043 | A | * | 6/1994 | Parro | ........................ H02P 9/42 322/23 |
| 5,565,760 | A | * | 10/1996 | Ball | .................... B60L 11/1805 318/373 |
| RE36,454 | E | * | 12/1999 | Ball | .................... B60L 11/1805 318/373 |

(Continued)

FOREIGN PATENT DOCUMENTS

| | | | |
|---|---|---|---|
| JP | 2010098908 A | * | 4/2010 |
| JP | 2014-15847 A | | 1/2014 |

*Primary Examiner* — Pedro J Cuevas
(74) *Attorney, Agent, or Firm* — Sughrue Mion, PLLC; Richard C. Turner

(57) ABSTRACT

A control device for rotating electric machine, which controls a rotating electric machine as a charging electric generator, using an inverter circuit, the control device including: an energization amount generating unit for generating a first electric generation mode in which an energization amount for a field winding and an energization amount for an armature winding of the rotating electric machine are controlled and the inverter circuit is driven to perform electric generation, and a second electric generation mode in which an energization amount for the field winding is controlled to perform electric generation; and an energization signal generating unit for, on the basis of variation-related information relevant to variation in one of electric generation torque and electric generation current of the rotating electric machine, performing switching between the first electric generation mode and the second electric generation mode, and generating energization signals for the field winding and the armature winding.

12 Claims, 11 Drawing Sheets

(56) References Cited

U.S. PATENT DOCUMENTS

| | | | | |
|---|---|---|---|---|
| 6,647,325 | B2* | 11/2003 | Shimazaki | B60L 11/1807 180/65.1 |
| 7,358,698 | B2* | 4/2008 | Seguchi | H02K 19/28 310/180 |
| 7,911,188 | B2* | 3/2011 | Wada | B60K 1/00 322/17 |
| 8,129,931 | B2* | 3/2012 | Maekawa | H02P 21/14 180/65.225 |
| 8,245,802 | B2* | 8/2012 | Inoue | B60K 6/485 180/65.27 |
| 8,736,235 | B2* | 5/2014 | Tabata | F02N 11/04 322/59 |
| 9,696,178 | B2* | 7/2017 | Maeda | H02K 13/00 |
| 9,859,836 | B2* | 1/2018 | Yokoyama | G05B 17/02 |
| 9,871,483 | B2* | 1/2018 | Iezawa | H02P 27/08 |
| 2002/0116100 | A1* | 8/2002 | Shimazaki | B60L 11/1807 701/22 |
| 2006/0290316 | A1* | 12/2006 | Seguchi | H02K 19/28 318/720 |
| 2010/0051363 | A1* | 3/2010 | Inoue | B60K 6/485 180/65.26 |
| 2010/0072958 | A1* | 3/2010 | Wada | B60K 1/00 322/22 |
| 2012/0261916 | A1* | 10/2012 | Tabata | H02P 9/08 290/31 |
| 2013/0197821 | A1* | 8/2013 | Maeda | H02K 13/00 702/34 |
| 2017/0331404 | A1* | 11/2017 | Takagi | H02P 29/662 |

* cited by examiner

CONTROL DEVICE FOR ROTATING ELECTRIC MACHINE

BACKGROUND OF THE INVENTION

Field of the Invention

The present invention relates to a control device for rotating electric machine, and in particular, a control device for a wound-field-type AC rotating electric machine which is mainly mounted on a vehicle, is connected to an internal combustion engine and a battery, operates as an electric motor for starting and assisting the internal combustion engine, operates as an electric generator for charging the battery, and has an armature winding and a field winding.

Background Art

In recent years, in view of requirement for improvement in fuel efficiency of a vehicle and environmental conservation, a vehicle that has an engine and another power source, e.g., a rotating electric machine, and which is called a hybrid vehicle, has been developed and put into practical use. In such a vehicle, it is necessary to selectively use the engine and the other power source and perform proper distribution therebetween, in accordance with the running condition.

For example, in order to suppress unnecessary fuel consumption due to idling of the engine, idle stop is adopted in many vehicles, in which the internal combustion engine is stopped when the vehicle has stopped due to a traffic light, traffic congestion, or the like, and thereafter, when the driver's intension to start to move the vehicle is detected on the basis of steering operation, release of the brake, or the like, the rotating electric machine restarts the internal combustion engine.

The rotating electric machine mounted on such a vehicle is connected to the engine, and operates with torque allowed to be transferred therebetween. Therefore, along with variation in the rotation speed of the engine, the rotation speed of the rotating electric machine also greatly varies, and a required operation rotation speed range is wide. Therefore, instead of a permanent magnet type in which a magnet is embedded in a rotor, a wound-field-type rotating electric machine is widely employed for which induced voltage can be easily control in accordance with the rotation speed.

In order to adapt to the idle stop described above, the rotating electric machine needs to be able to output great torque in a low-speed state when the internal combustion engine is restarted, and thus the battery voltage as a power supply and the operation voltage of the rotating electric machine are designed to be high, to achieve output enhancement.

In the case of using, as an electric generator, the rotating electric machine with the battery voltage designed to be high, in a low-speed region, induced voltage that can be generated by the rotating electric machine is insufficient for the battery voltage, and the battery cannot be charged. In such a state, it is necessary to charge the battery after stepping up the electric generation voltage while using an inverter as a step-up chopper by performing switching for the inverter (hereinafter, such a step-up electric generation method is referred to as an inverter electric generation mode). However, in general, in the inverter electric generation mode, the number of times of inverter switching increases, and the efficiency tends to deteriorate due to switching loss. Therefore, in a high-speed region in which induced voltage that can charge the battery can be obtained without being stepped up, it is desirable to obtain target electric generation voltage by performing rectification by a diode and controlling the energization amount of field current without performing inverter switching (hereinafter, such an electric generation method is referred to as an alternator electric generation mode). As described above, in the case where the battery voltage and the operation voltage of the rotating electric machine are designed to be high, an appropriate electric generation method differs depending on the driving condition of the vehicle, and therefore it is necessary to switch between these two electric generation modes in accordance with the driving condition.

As a method for switching between the inverter electric generation mode and the alternator electric generation mode, Patent Document 1 shown below discloses a feature of performing the switching in accordance with the rotation speed. That is, the rotation speed at which the electric generation mode is to be switched is controlled in accordance with the electric load amount of the rotating electric machine, and hysteresis is provided to the rotation speed at which the switching is to be performed, thereby reducing the frequency of occurrence of switching of the electric generation mode and reducing shock due to rotation variation.

CITATION LIST

Patent Document

Patent Document 1: Japanese Laid-Open Patent Publication No. 2004-15847

SUMMARY OF THE INVENTION

Problems to be Solved by the Invention

At the time of switching of the electric generation mode, a current command value changes, whereby torque and current vary. In the control technology disclosed in Patent Document 1, as a method for reducing torque variation at the time of switching of the electric generation mode, it is disclosed that energization with field current is stopped before switching of the electric generation mode, and field current is gradually increased after the switching is completed, and it is disclosed that current in the field winding and current in the armature winding are controlled so that electric generation torque becomes almost the same between before and after switching of the electric generation mode or the difference therebetween decreases.

However, Patent Document 1 does not describe a specific method for controlling the field current and the armature current so that the electric generation torque becomes almost the same. In addition, between before and after the actual switching of the electric generation mode, the field current can greatly differ even though a command value for the electric generation torque is the same. Therefore, there is a problem that, if response of the field winding is slow, difference occurs between the command value and the actual value due to response delay of the field current, whereby torque varies.

Here, the reason that the above phenomenon occurs will be described while showing the relationship among the electric generation torque, the armature current, and the field current.

In a given driving condition, when a rotating electric machine having a field winding and an armature winding operates as an electric generator, electric generation torque due to electric generation is represented by the following expression.

[Mathematical 1]

$$Trq = p_m \cdot \{(M_f i_f + L_d i_d) \cdot i_q - (L_q i_q) \cdot i_d\} \quad (1)$$

Here, $p_m$ is a pole pair number of a rotor of the rotating electric machine, $i_f$ is field current, $i_d$ and $i_q$ are d-axis current and q-axis current, $M_f$ is an inductance of the field winding, $L_d$ and $L_q$ are d-axis and q-axis inductances of the armature winding. It is noted that the d-q axis is a rotating coordinate system synchronized with the direction of a field magnetic flux generated by the field winding.

From the expression (1), it is found that plural combinations of the field current and the armature current that cause the same electric generation torque are conceivable. In the inverter electric generation mode, since both the field current and the armature current are controlled, any combination of the field current and the armature current that satisfies the expression (1) can be selected in response to the inputted electric generation torque command value. However, in the alternator electric generation mode, only the field current is controlled in response to the input electric generation torque command value, while the armature current is merely converted from AC to DC through full-wave rectification. Therefore, even under the control according to the same electric generation torque command, the field current $i_f$ is not necessarily the same between the inverter electric generation mode and the alternator electric generation mode.

Next, the speeds of response to variation, of the field winding and the armature winding will be described. In a wound-field-type rotating electric machine, in general, the field winding is excited in a shunt-winding manner. Therefore, large current does not flow, and the number of turns is designed to be large in order to obtain a great magnetomotive force with small current. On the other hand, as for the armature winding, electric generation current and driving current need to flow through the armature winding, and the number of turns is often designed to be small in order to reduce the resistance. For these reasons, the inductance of the field winding is likely to be greater than the inductance of the armature winding.

For the above reason, in the case where the command value for the field current greatly varies between before and after switching of the electric generation mode, the period until the field current follows the command value becomes much longer than the period until the armature current follows the command value. Due to this response delay, error occurs between the field current and the field current command value, thus causing a problem that the electric generation torque varies due to the error.

Solution to the Problems

A control device for rotating electric machine according to the present invention controls a rotating electric machine as a charging electric generator, using an inverter circuit, and includes: an energization amount generator for generating a first electric generation mode in which an energization amount for a field winding and an energization amount for an armature winding of the rotating electric machine are controlled and the inverter circuit is driven to perform electric generation, and a second electric generation mode in which only an energization amount for the field winding is controlled to perform electric generation; and an energization signal generator for, on the basis of variation-related information relevant to variation in at least one of electric generation torque and electric generation current of the rotating electric machine, performing switching between the first electric generation mode and the second electric generation mode, and generating energization signals for the field winding and the armature winding.

Effect of the Invention

The control device for rotating electric machine according to the present invention enables reduction in electric generation torque variation caused at the time of switching of the electric generation mode.

DETAILED DESCRIPTION OF THE INVENTION

Embodiment 1

Hereinafter, a control device for rotating electric machine according to embodiment 1 of the present invention will be described.

Figure 1:
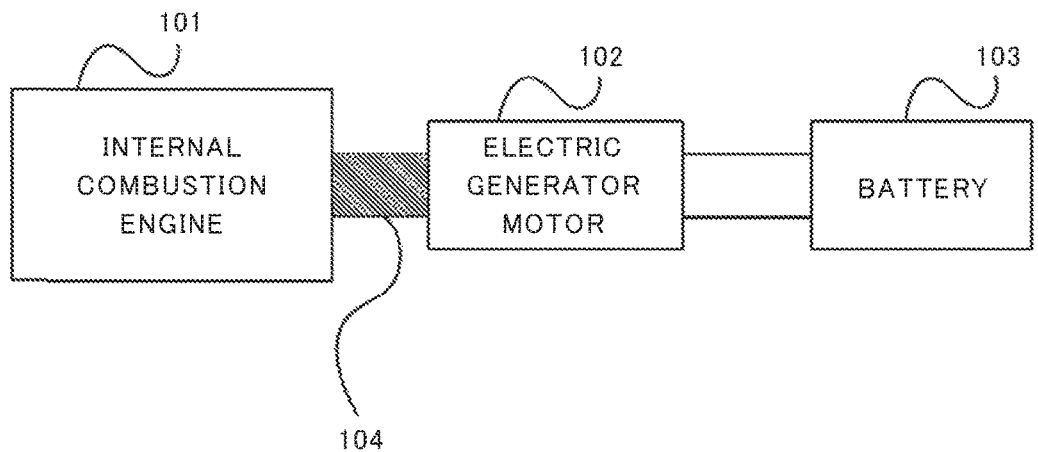
FIG. 1 is an entire system configuration of a control device for rotating electric machine according to embodiment 1 of the present invention.

FIG. 1 is an entire system configuration of a control device for wound-field-type rotating electric machine as mounted on a vehicle, according to embodiment 1 of the present invention.

In FIG. 1, an electric generator motor 102 is connected to an internal combustion engine 101 for vehicle via a power transmission unit 104 using a shaft, a pulley, or a belt, so as to be able to transmit torque to or receive torque from the internal combustion engine 101 for vehicle, and is electrically connected to a battery (or capacitor, hereinafter, referred to as a battery) 103. The electric generator motor 102 functions as an electric motor for starting and assisting the internal combustion engine 101 for vehicle, and as an electric generator for charging the battery 103. The battery 103 may be shared with another vehicle load, or may be dedicated for this electric generator motor.

Figure 2:
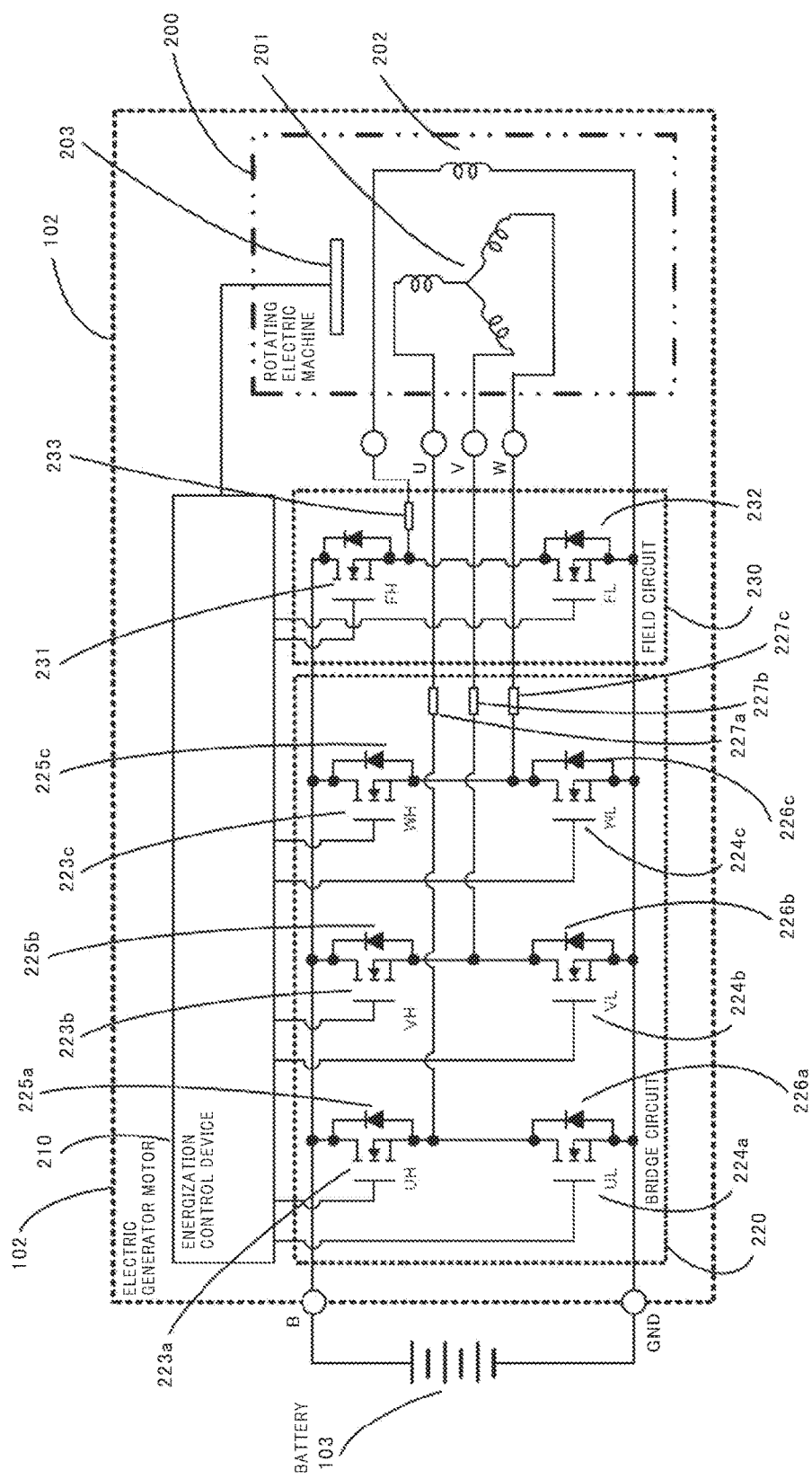
FIG. 2 is a block diagram showing the configuration of an electric generator motor provided with the control device for rotating electric machine according to embodiment 1 of the present invention.

FIG. 2 is a block diagram showing the configuration of the electric generator motor provided with the control device for rotating electric machine according to embodiment 1 of the present invention.

In FIG. 2, the electric generator motor 102 is composed of a rotating electric machine 200, an energization control device 210, a bridge circuit 220, and a field circuit 230. The function as an electric motor and the function as an electric generator, of the electric generator motor 102 are achieved by energizing the armature winding 201 and the field winding 202 of the rotating electric machine 200 through control of the bridge circuit 220 and the field circuit 230 by the energization control device 210.

That is, by energizing each of the armature winding 201 and the field winding 202, torque for starting and assisting the internal combustion engine is generated, or current for charging the battery is generated. The rotating electric machine 200 has a rotational position sensor 203 such as an encoder or a resolver therein.

In FIG. 2, the bridge circuit 220 is composed of: a three-phase inverter circuit composed of upper-arm switching elements 223a to 223c and lower-arm switching elements 224a to 224c which are connected in a three-phase bridge manner; a three-phase bridge rectification circuit composed of upper-arm diodes 225a to 225c and lower-arm diodes 226a to 226c which are connected in antiparallel to the switching elements; and armature current sensors 227a to 227c for detecting armature currents flowing from the respective phases to the armature winding 201.

Each switching element is formed of a MOSFET (Metal-Oxide-Semiconductor Field-Effect Transistor), an IGBT (Insulated Gate Bipolar Transistor), or the like.

The bridge circuit 220 configured as described above executes ON/OFF control of each switching element in accordance with an energization signal from the energization control device 210, thereby energizing the armature winding 201.

Here, the upper-arm diodes 225a to 225c and the lower-arm diodes 226a to 226c are described as independent diode elements. However, parasitic diodes existing in the upper-arm switching elements 223a to 223c and the lower-arm switching elements 224a to 224c may be used instead of the independent diode elements.

The field circuit 230 is composed of a switching element 231 in an upper arm, a switching element 232 in a lower arm, and a field current sensor 233 for detecting current in the field winding 202. The field circuit 230 configured as described above executes ON/OFF control of each switching element in accordance with an energization signal from the energization control device 210, thereby energizing the field winding 202.

In FIG. 2, the rotating electric machine 200 is a three-phase wound-field-type AC rotating electric machine having armature windings and field windings for three phases. However, another winding method or another number of phases may be employed.

Figure 3:
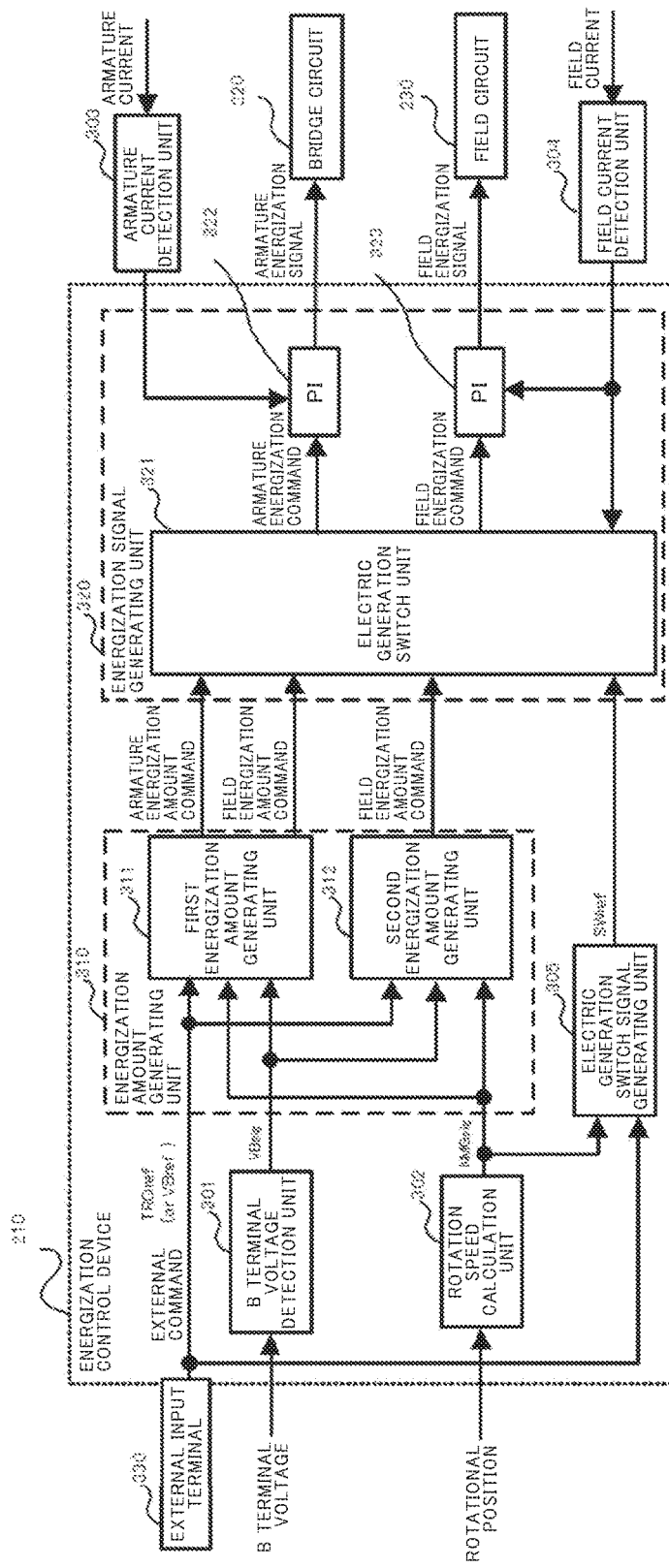
FIG. 3 is a block diagram showing the configuration of an energization control device of the rotating electric machine according to embodiment 1 of the present invention.

FIG. 3 is a block diagram showing the configuration of the energization control device 210 of the rotating electric machine according to embodiment 1 of the present invention.

In FIG. 3, 301 denotes a B terminal voltage detection unit for detecting B terminal voltage. 302 denotes a rotation speed calculation unit for calculating the rotation speed of the rotating electric machine 200 on the basis of output from the rotational position sensor 203. 303 denotes an armature current detection unit for detecting armature current on the basis of outputs from the armature current sensors 227a to 227c. 304 denotes a field current detection unit for detecting field current on the basis of output from the field current sensor 233. 305 denotes an electric generation switch signal generating unit for generating a signal for switching the electric generation mode on the basis of output from the rotation speed calculation unit 302.

310 denotes an energization amount generating unit which includes a first energization amount generating unit 311 for generating an energization amount command value for an inverter electric generation mode, and a second energization amount generating unit 312 for generating an energization amount command value for an alternator electric generation mode.

320 denotes an energization signal generating unit which includes: an electric generation switch unit 321 for performing determination as to switching between the two electric generation modes; an armature energization signal generating unit 322 for generating an energization signal to be applied to the bridge circuit 220; and a field energization signal generating unit 323 for generating an energization signal to be applied to the field circuit 230.

The energization control device 210 is composed of the B terminal voltage detection unit 301, the rotation speed calculation unit 302, the armature current detection unit 303, the field current detection unit 304, the electric generation switch signal generating unit 305, the energization amount generating unit 310, and the energization signal generating unit 320 described above.

The energization control device 210 has various functions for controlling the rotating electric machine, in addition to the functions shown in FIG. 3, but here, functions relevant to the present invention are described.

Figure 4:
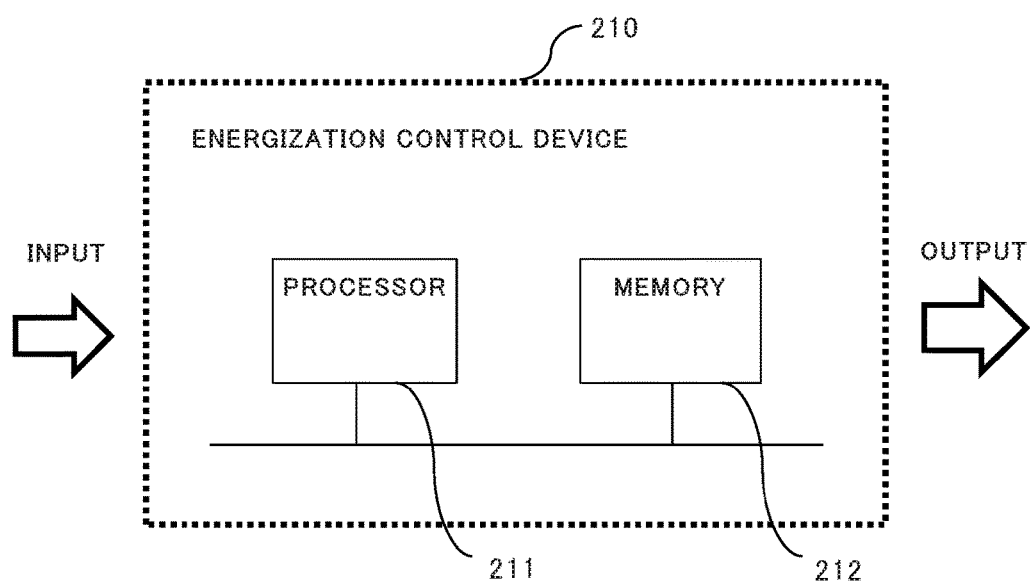
FIG. 4 is a diagram showing an example of the hardware configuration of the energization control device of the rotating electric machine according to embodiment 1 of the present invention.

As an example of the hardware configuration of the energization control device 210, as shown in FIG. 4, the energization control device 210 may be composed of a processor 211 and a memory 212, and the operations described later may be executed by a program stored in the memory. A logic circuit may be used together with the processor 211.

Next, operation of the energization control device 210 will be described with reference to FIG. 3.

The B terminal voltage detection unit 301 detects terminal voltage VB of the positive terminal B, using the potential of the negative terminal GND of the bridge circuit 220 and the field circuit 230 as a reference, and inputs the terminal voltage VB to the energization amount generating unit 310. The rotation speed calculation unit 302 calculates a rotation speed NMG of the rotating electric machine 200 on the basis of rotational position information about the rotating electric machine 200 detected by the rotational position sensor 203 connected to the rotating electric machine 200, and inputs the rotation speed NMG to the energization amount generating unit 310. The armature current detection unit 303 detects currents Iu, Iv, Iw flowing through the armature winding 201 by the armature current sensors 227a to 227c, and inputs the currents Iu, Iv, Iw to the armature energization signal generating unit 322. The field current detection unit 304 detects field current If flowing through the field winding 202 by the field current sensor 233, and inputs the field current If to the field energization signal generating unit 323.

The first energization amount generating unit 311 receives the B terminal voltage VB obtained from the B terminal voltage detection unit 301, the rotation speed NMG obtained from the rotation speed calculation unit 302, and an electric generation torque command value TRQref or an electric generation voltage command value VBref inputted from an external input terminal 330, and generates armature energization amount command values Idref1 and Iqref1 and a field energization amount command value Ifref1, by referring to a map. Here, the map means a table in which an appropriate control amount or output with respect to an inputted command value or an observed status amount is stored by being calculated in advance, and referring to the map means selecting an output value corresponding to an input value from the table.

Figure 5:
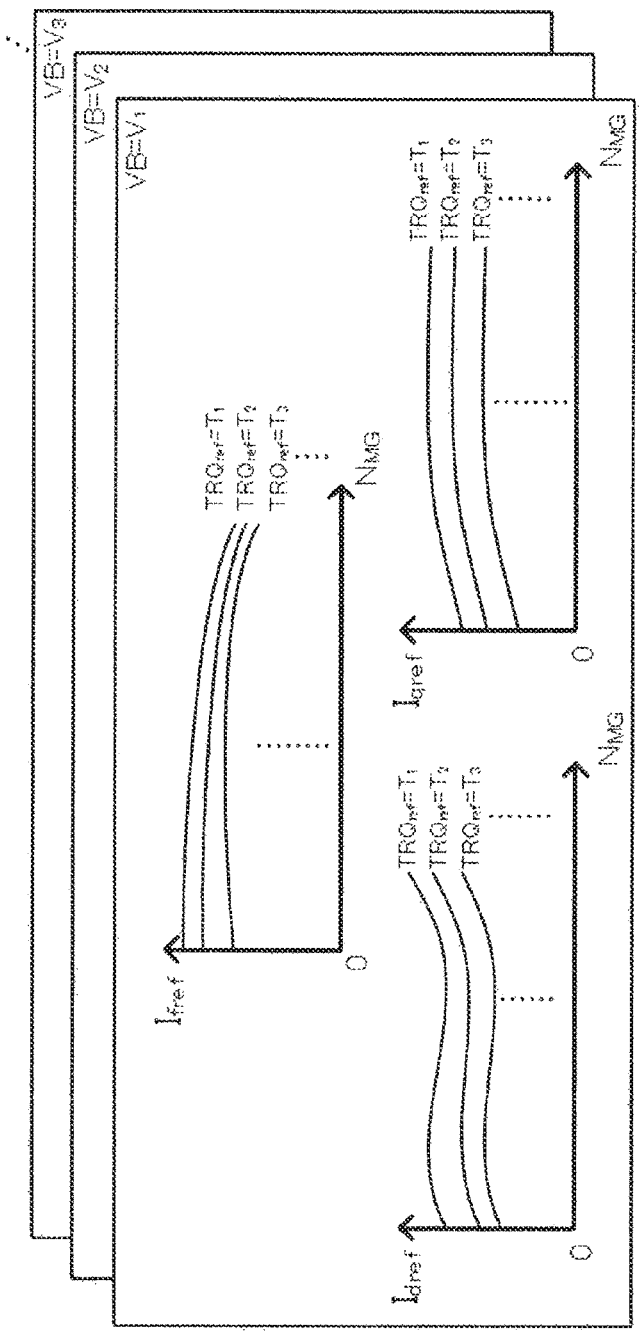
FIG. 5 is an explanation diagram illustrating a map stored in a first energization amount generating unit according to embodiment 1 of the present invention.

FIG. 5 shows a map stored in the first energization amount generating unit 311, as an example of the map reference. Tables for respectively determining the field energization amount command value Ifref and the armature energization amount command values Idref and Iqref are stored, and when the B terminal voltage VB, the rotation speed NMG, and the electric generation torque command value TRQref are inputted, the command values corresponding to these inputs are uniquely determined from the respective tables.

The second energization amount generating unit 312 receives the B terminal voltage VB obtained from the B terminal voltage detection unit 301, the rotation speed NMG obtained from the rotation speed calculation unit 302, and the electric generation torque command value TRQref or the electric generation voltage command value VBref inputted from the external input terminal 330, and generates a field energization amount command value Ifref2 by referring to a map.

Here, the first energization amount generating unit 311 and the second energization amount generating unit 312 generate the energization amount commands by referring to the maps, but may perform calculation in real time on the basis of inputted values, to generate the energization amount command values for each electric generation mode.

The energization signal generating unit 320 is composed of the electric generation switch unit 321 for switching the electric generation mode, the armature energization signal generating unit 322 for generating an armature energization signal, and the field energization signal generating unit 323 for generating a field energization signal.

The electric generation switch unit 321 switches the electric generation mode on the basis of the energization amount command values generated by the energization amount generating unit 310, an electric generation switch signal generated by the electric generation switch signal generating unit 305, and field current detected by the field current detection unit 304.

In the inverter electric generation mode, in response to the inputted armature energization amount command values Idref and Iqref, the armature energization signal generating unit 322 performs feedback control for the armature currents Id and Iq detected by the armature current detection unit 303, to output a PWM signal for causing the armature currents Id and Iq to follow the armature energization amount command values Idref and Iqref. On the basis of the PWM signal, ON/OFF control is performed for the switching elements 223a to 223c and 224a to 224c of the bridge circuit 220, whereby the electric generation torque is controlled so as to coincide with the electric generation torque command value TRQref.

On the other hand, in the alternator electric generation mode, since the armature energization amount command values are not inputted, all the switching elements of the bridge circuit 220 are controlled to be OFF. Alternatively, for each element, synchronous rectification electric generation may be performed in which the corresponding switching element is turned on during the period in which current flows through the diode connected in antiparallel.

In response to the inputted field energization amount command value Ifref, the field energization signal generating unit 323 performs feedback control for the field current If detected by the field current detection unit 304, to output a PWM signal for causing the field current If to follow the field energization amount command value Ifref. On the basis of the PWM signal, ON/OFF control is performed for the switching elements 231 and 232 of the field circuit 230, whereby electric generation torque TRQ is controlled so as to coincide with the electric generation torque command value TRQref.

The control device for rotating electric machine according to embodiment 1 configured as described above controls the rotating electric machine 200 so as to operate as an electric motor to supply torque to the internal combustion engine 101 for vehicle at the time of starting the internal combustion engine 101 for vehicle, and operate as an electric generator to charge the battery 103 after the internal combustion engine 101 for vehicle is started.

When the rotating electric machine 200 operates as an electric generator, if the rotation speed of the rotating electric machine 200 is smaller than a predetermined value, the voltage that can be generated is lower than the battery voltage, and therefore, by the inverter electric generation mode, the six switching elements 223a to 223c and 224a to 224c are operated, and an energization signal is generated so as to operate the bridge circuit 220 as a step-up chopper by a PWM signal, thereby stepping up the electric generation voltage and charging the battery 103.

If the rotation speed exceeds the predetermined value, the voltage that can be generated becomes higher than the battery voltage, and therefore, it is not necessary to step up the electric generation voltage any longer. Therefore, the electric generation mode is switched to the alternator electric generation mode, control for the switching elements 223a to 223c and 224a to 224c by the PWM signal is stopped, and the energization amount for the field winding 202 is controlled, thereby charging the battery 103. In the alternator electric generation mode, the electric generation current charges the battery 103 through the six diodes 225a to 225c and 226a to 226c composing the three-phase bridge rectification circuit.

As for the energization amount command values in each of the inverter electric generation mode and the alternator electric generation mode, the first energization amount generating unit 311 and the second energization amount generating unit 312 in the energization amount generating unit 310 generate the energization amount command values by referring to the maps in which each command value associated with the driving condition and the electric generation torque command value is stored in advance. That is, as described above in FIG. 5, the first energization amount generating unit 311 stores, in a table, the armature energization amount command values Idref1 and Iqref1 and the field energization amount command value Ifref1 as the energization amount command values for the inverter electric generation mode, and the second energization amount generating unit 312 stores, in a table, the field energization amount command value Ifref2 as the energization amount command value for the alternator electric generation mode.

Here, a method for generating command value maps for the respective electric generation modes, stored in the first energization amount generating unit and the second energization amount generating unit in the present embodiment 1 will be described on the basis of a flowchart shown in FIG. 6.

Figure 6:
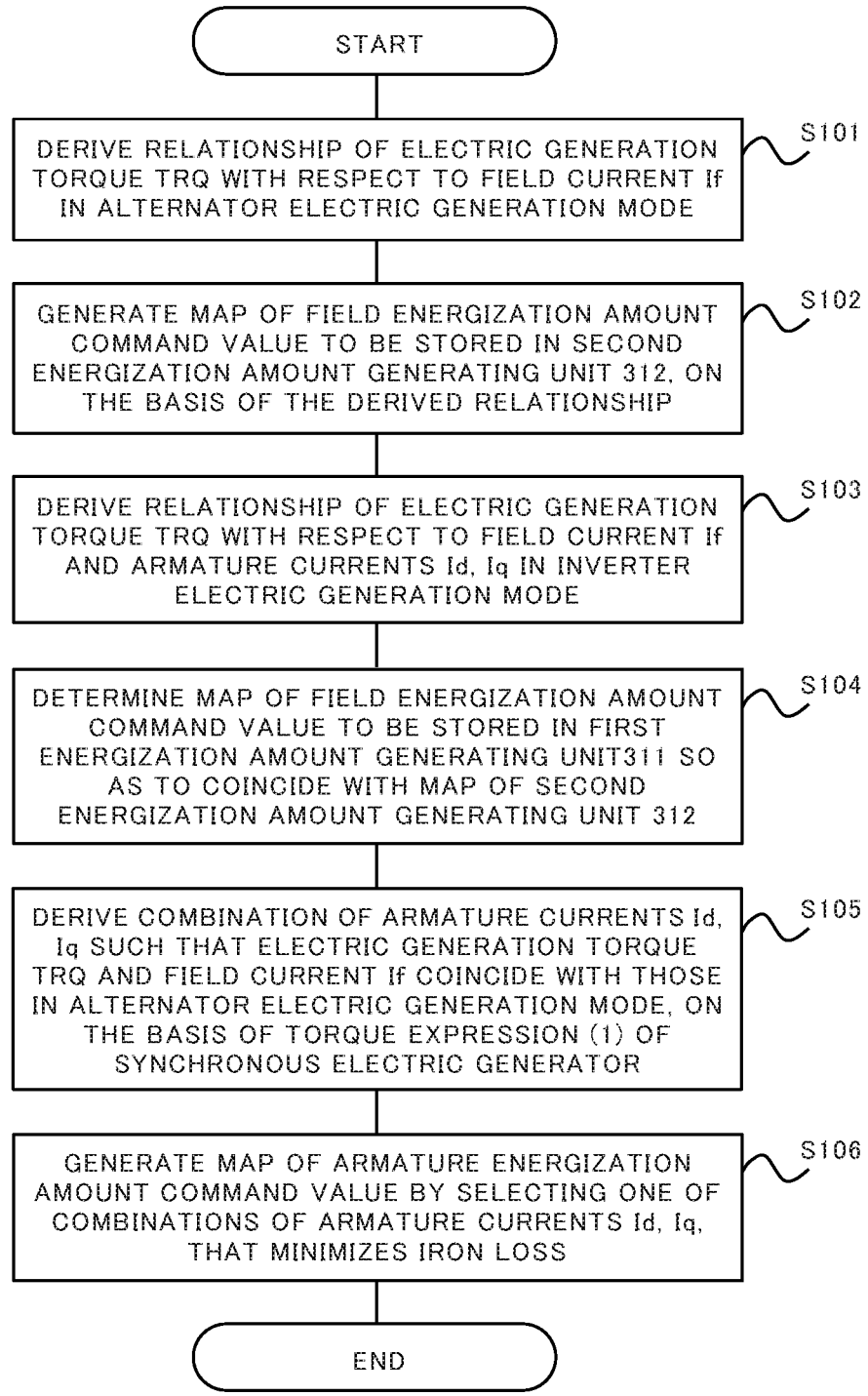
FIG. 6 is a flowchart showing a procedure for generating the map according to embodiment 1 of the present invention.

FIG. 6 shows a procedure for generating the maps according to embodiment 1 of the present invention. First, the relationship of the electric generation torque TRQ with respect to the field current If when the rotating electric machine 200 which is a control target is operated in the alternator electric generation mode, is derived (step S101). On the basis of the derived relationship, a map of the field energization amount command value Ifref2 associated with the electric generation torque command value TRQref is generated which is to be stored in the second energization amount generating unit 312 (step S102).

Next, in order to determine the map to be stored in the first energization amount generating unit 311 on the basis of the expression (1) for torque of the rotating electric machine described above, the relationship of the electric generation torque TRQ with respect to variations in the field current If and the armature currents Id and Iq when the rotating electric machine 200 is operated in the inverter electric generation mode, is derived (step S103).

At this time, as shown in the expression (1) for torque, there are plural combinations of If, Id, and Iq that cause a given electric generation torque. However, for example, if the combination is selected so as to maximize the electric generation efficiency in the inverter electric generation mode, the field energization amount command value Ifref1 stored in the first energization amount generating unit 311 and the field energization amount command value Ifref2 stored in the second energization amount generating unit 312 become different values with respect to the same electric generation torque command value TRQref, thereby causing torque variation due to response delay of the field current as shown in the problem described above. Such torque variation is caused because the current command value in the inverter electric generation mode and the current command value in the alternator electric generation mode are determined independently of each other. Thus, for example, also in the case where the combination is selected so as to minimize iron loss in the inverter electric generation mode, torque variation occurs similarly.

Therefore, in the present embodiment 1, the field energization amount command value Ifref1 to be stored in the first energization amount generating unit 311 is set to always coincide with the field energization amount command value Ifref2 to be stored in the second energization amount generating unit. Thus, the field current command value does not vary between before and after switching of the electric generation mode, and response delay of the field current as described above does not occur. That is, a combination of armature currents Id and Iq is derived so that the expression (1) for torque is satisfied and both values of the field current If and the electric generation torque TRQ when the rotating electric machine 200 is operated in the inverter electric generation mode coincide with those when the rotating electric machine 200 is operated in the alternator electric generation mode (step S104). Although plural combinations of Id and Iq that satisfy the torque expression (1) are conceivable, in the present embodiment 1, command values for the armature currents Id and Iq are determined so as to minimize the sum of iron loss and copper loss (step S105). Although the combination that minimizes the sum of iron loss and copper loss is employed in the present embodiment 1, another combination (for example, a combination that maximizes the electric generation efficiency) may be employed.

Finally, on the basis of the derived relationship, a map of the field energization amount command value Ifref1 and the armature energization amount command values Idref1 and Iqref1 associated with the electric generation torque command value TRQref is generated which is to be stored in the first energization amount generating unit 311 (step S106).

As described above, in the present embodiment 1, with respect to a given electric generation torque command value TRQref, the field energization amount command value Ifref1 to be stored in the first energization amount generating unit 311 is prescribed so as to always coincide with the field energization amount command value Ifref2 to be stored in the second energization amount generating unit 312, and the armature energization amount command values Idref and Iqref are determined in accordance with the prescribed field energization amount command value Ifref1. Thus, with respect to the same electric generation torque command value TRQref, the first energization amount generating unit 311 and the second energization amount generating unit 312 generate the same field energization amount command value Ifref.

Therefore, even if the electric generation switch unit 321 performs switching between the inverter electric generation mode and the alternator electric generation mode at any timing, the field current If and the electric generation torque TRQ do not vary between before and after the switching of the electric generation mode, and torque pulsation due to response delay of the field current If does not occur.

Figure 7:
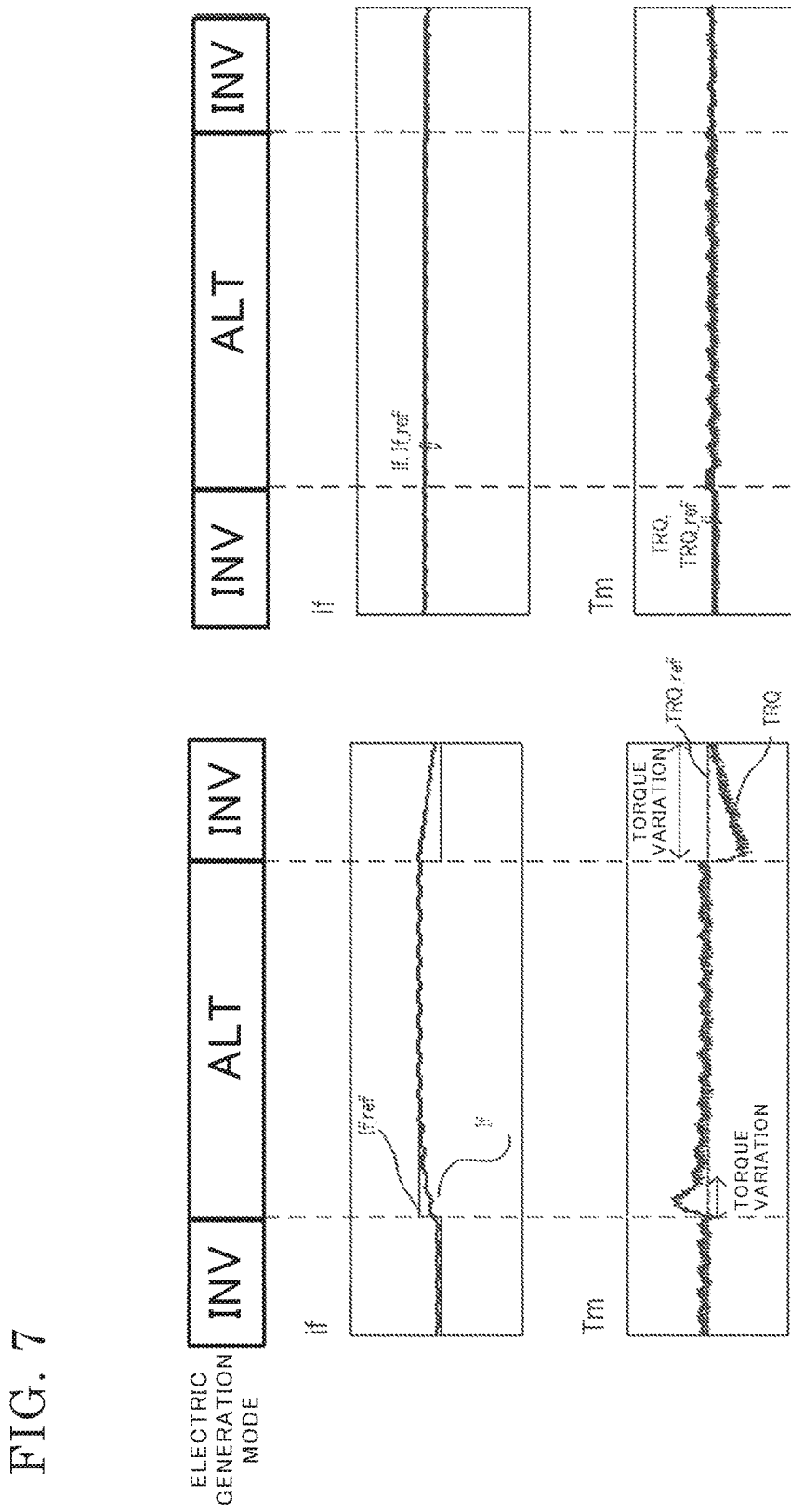
FIG. 7 is an explanation diagram showing variations in current and torque between before and after switching of an electric generation mode according to embodiment 1 of the present invention in comparison with a conventional method.

FIG. 7 shows variations in the current (If) and torque (Tm) between before and after switching of the electric generation mode according to the present embodiment 1 in comparison with a conventional method, and shows a circuit simulation result in graphs. The conventional method is shown at the left, and the method according to embodiment 1 is shown at the right. In the conventional method, between before and after switching of the electric generation mode (in FIG. 7, switching from INV to ALT or switching from ALT to INV), the field energization amount command value Ifref varies, and during a period until the field current If follows the variation in the command value, the electric generation torque Tm varies.

On the other hand, in the method according to embodiment 1, the field energization amount command value Ifref1 generated by the first energization amount generating unit 311 is designed so that the difference thereof from the field energization amount command value Ifref2 generated by the second energization amount generating unit 312 becomes zero. Therefore, the field current If does not vary between before and after switching of the electric generation mode. Thus, it is found that variation in the electric generation torque Tm is suppressed.

As described above, in embodiment 1 of the present invention, control is performed so that the electric generation torque and the energization amount for the field winding each become the same between before and after switching of the electric generation mode. Therefore, the electric generation torque does not vary, and torque shock and current pulsation due to switching of the electric generation mode can be suppressed.

Embodiment 2

Figure 8:
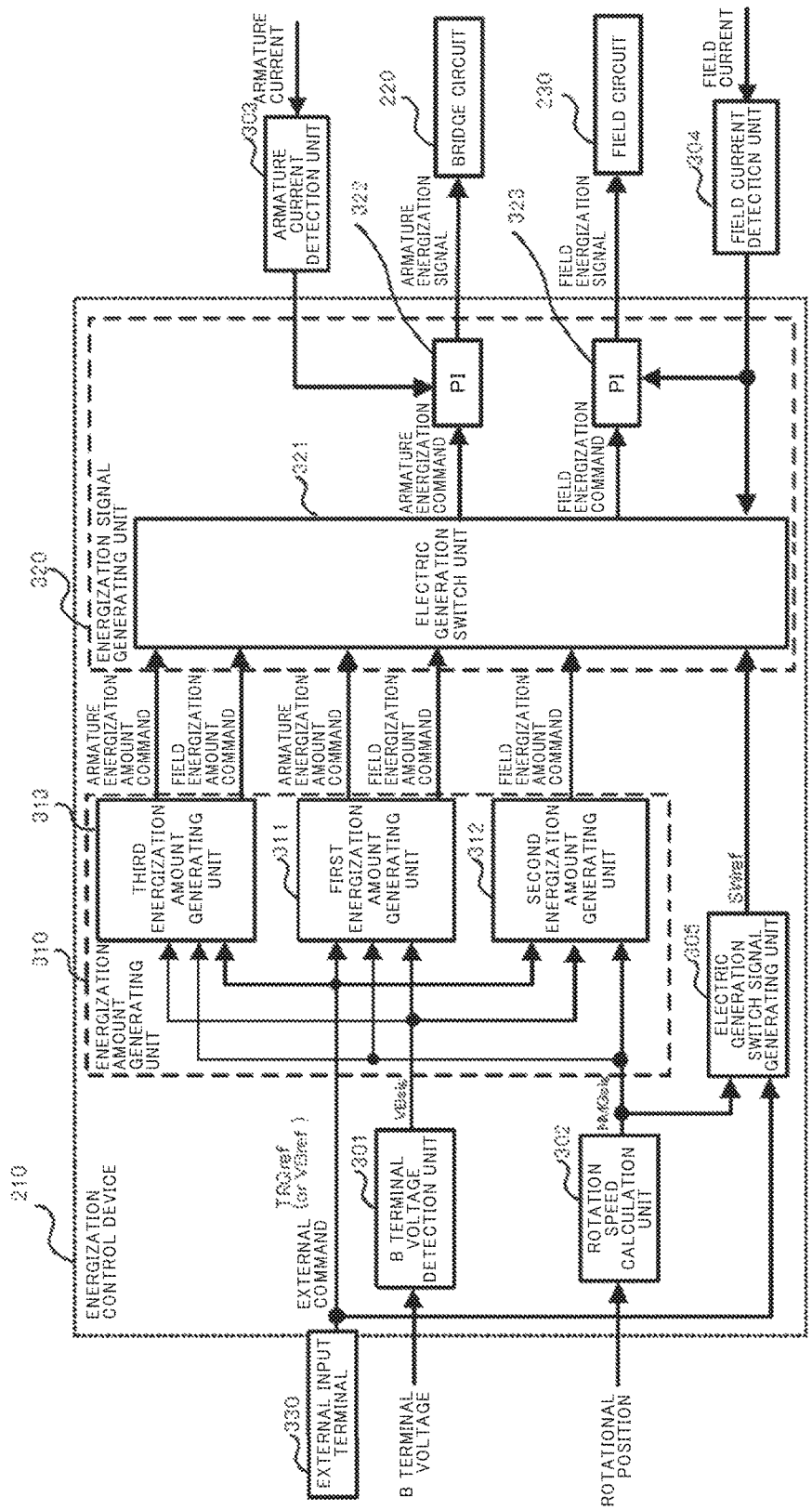
FIG. 8 is a block diagram showing the configuration of an energization control device of a rotating electric machine according to embodiment 2 of the present invention.

Next, a control device for rotating electric machine according to embodiment 2 of the present invention will be described. FIG. 8 is a block diagram showing the configuration of an energization control device 210 for rotating electric machine, according to embodiment 2 of the present invention. In FIG. 8, the same reference characters as those in FIG. 3 denote the same or corresponding functions. In the energization control device 210 for rotating electric machine according to the present embodiment 2, a third energization amount generating unit 313 is newly added to the energization amount generating unit 310, and the condition for switching the electric generation mode in the electric generation switch unit 321 is modified, as compared to embodiment 1.

In FIG. 8, the third energization amount generating unit 313 stores a map of such a field energization amount command value Ifref3 and armature energization amount command values Idref3 and Iqref3 as to maximize the electric generation efficiency with respect to an electric generation torque command value in the inverter electric generation mode. This map is referred to as a maximum efficiency map.

In addition, in the present embodiment 2, a map stored in the first energization amount generating unit 311 for causing the field energization amount command value Ifref1 to always coincide with the field current command value in the alternator electric generation mode, is referred to as a shockless map.

Figure 9:
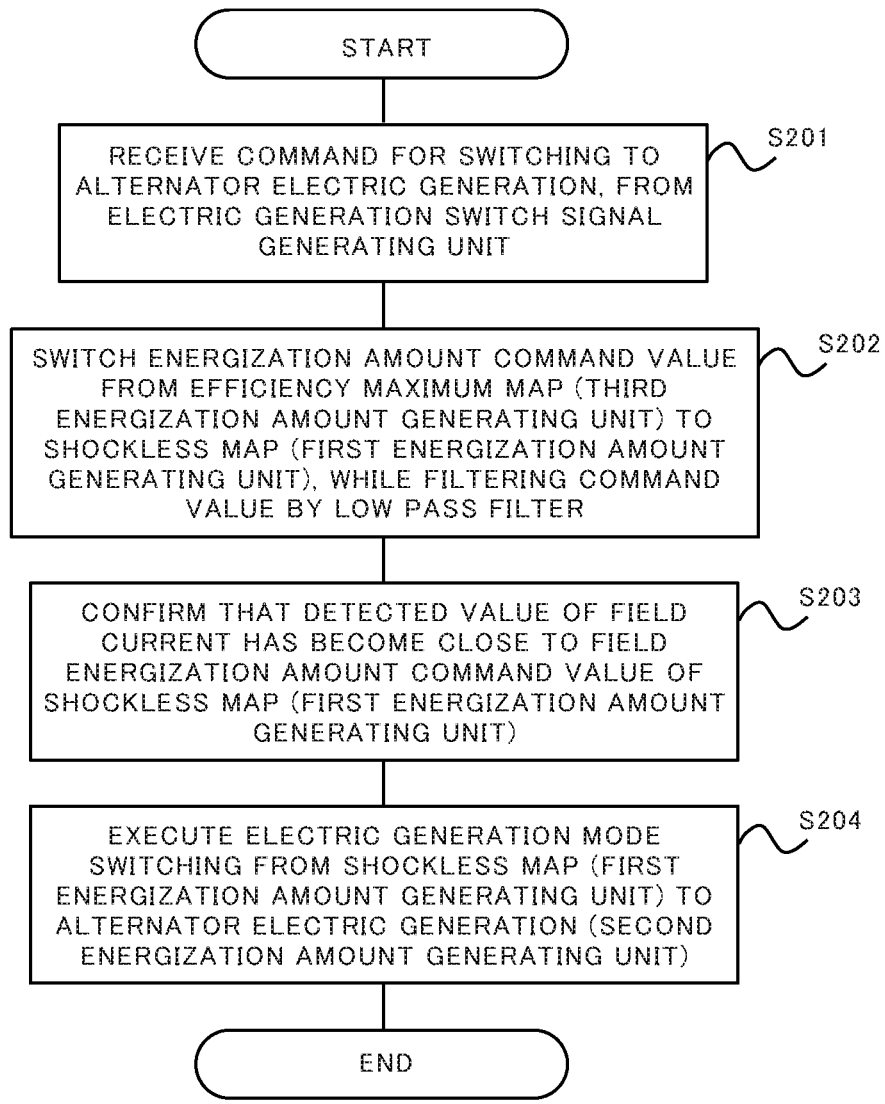
FIG. 9 is a flowchart illustrating a procedure for switching between an inverter electric generation mode and an alternator electric generation mode according to embodiment 2 of the present invention.

FIG. 9 is a flowchart illustrating a procedure for switching between the inverter electric generation mode and the alternator electric generation mode in the present embodiment 2. During operation in the inverter electric generation mode, the energization signal generating unit 320 controls the energization amount for the rotating electric machine so as to maximize the electric generation efficiency, on the basis of the energization amount command value generated by the third energization amount generating unit 313.

First, due to increase in the rotation speed and variation in the electric generation torque command value, when the electric generation switch signal generating unit 305 generates an electric generation switch signal so as to switch the electric generation mode from the inverter electric generation mode to the alternator electric generation mode (step S201), the electric generation switch unit 321 switches the command value to be used for generating the energization signal, from the third energization amount generating unit 313 to the first energization amount generating unit 311 (step S202). At this time, since the field energization amount command value Ifref1 generated by the first energization amount generating unit 311 is different from the field energization amount command value Ifref3 generated by the third energization amount generating unit 313, variation in torque can occur at the time of switching of the command value.

Accordingly, in the present embodiment 2, at the time of switching between the first energization amount generating unit 311 and the third energization amount generating unit 313, the field energization amount command value Ifref and the armature energization amount command values Idref and Iqref are filtered by a low pass filter, thereby suppressing the variation speeds of the command values. Thus, the field current smoothly varies without delay from the field current command value, whereby variation in torque is suppressed.

Here, at the time of switching of the command value between the first energization amount generating unit and the third energization amount generating unit, the command value is filtered by a low pass filter. However, in practice, another method may be used as long as the speed of variation in the command value can be slowed down and response delay of the field current can be prevented. For example, the amounts of variations in the field energization amount command value Ifref and the armature energization amount command values Idref and Iqref per time may be limited, whereby the command values may be controlled so as to be gradually switched.

Next, the energization signal generating unit 320 compares the field current If obtained from the field current detection unit 304, with the field energization amount command value Ifref1 generated by the first energization amount generating unit 311, to confirm that the field current If has become close to the field energization amount command value Ifref1 (step S203). After it is confirmed that the field current If has become close to the field energization amount command value Ifref1, switching between the inverter electric generation mode and the alternator electric generation mode is performed as in embodiment 1 (step S204).

In the present embodiment 2, during operation in the inverter electric generation mode, control using the maximum efficiency map is always performed, and after a signal for switching to the alternator electric generation mode is received, operation is performed using the shockless map for causing the field current If to coincide with the field energization amount command value Ifref in the alternator electric generation mode. Thus, after the field current If is caused to coincide with the value in the alternator electric generation mode, the operation is switched to the alternator electric generation mode.

On the other hand, during operation in the alternator electric generation mode, the energization signal generating unit 320 controls the energization amount for the rotating electric machine on the basis of the energization amount command value generated by the second energization amount generating unit 312.

Due to decrease in the rotation speed or variation in the electric generation torque command value, when the electric generation switch signal generating unit 305 generates an electric generation switch signal so as to switch the electric generation mode from the alternator electric generation mode to the inverter electric generation mode, the electric generation switch unit 321 switches the command value to be used for generating the energization signal, from the second energization amount generating unit 312 to the first energization amount generating unit 311. This switch operation is the same as in embodiment 1 described above, so that torque pulsation or current pulsation does not occur at the time of switching of the electric generation mode.

Next, the electric generation switch unit 321 switches the command value to be used for generating the energization signal, from the first energization amount generating unit 311 to the third energization amount generating unit 313. At this time, as in step S202 described above, the field energization amount command value Ifref and the armature energization amount command values Idref and Iqref are filtered by a low pass filter or the amounts of variations in these command values are limited, whereby the speeds of variations in the command values are slowed down and response delay of the field current is prevented. Thus, the field current smoothly varies without delay from the field current command value, whereby variation in torque is suppressed.

After the switching is completed, the inverter electric generation mode is executed using the energization amount command value generated by the third energization amount generating unit 313, i.e., using the maximum efficiency map.

By performing control as described above, it becomes possible to achieve the inverter electric generation mode that is not subject to such a constraint that the field energization amount command value Ifref1 should be caused to coincide with the field energization amount command value Ifref2 for the alternator electric generation mode, and the efficiency in the inverter electric generation mode can be improved.

Embodiment 3

Next, a control device for rotating electric machine according to embodiment 3 of the present invention will be described. In the control device for rotating electric machine according to the present embodiment 3, the procedure for generating the map to be stored in the first energization amount generating unit 311 in the energization control device 210 is modified as compared to embodiment 1.

Figure 10:
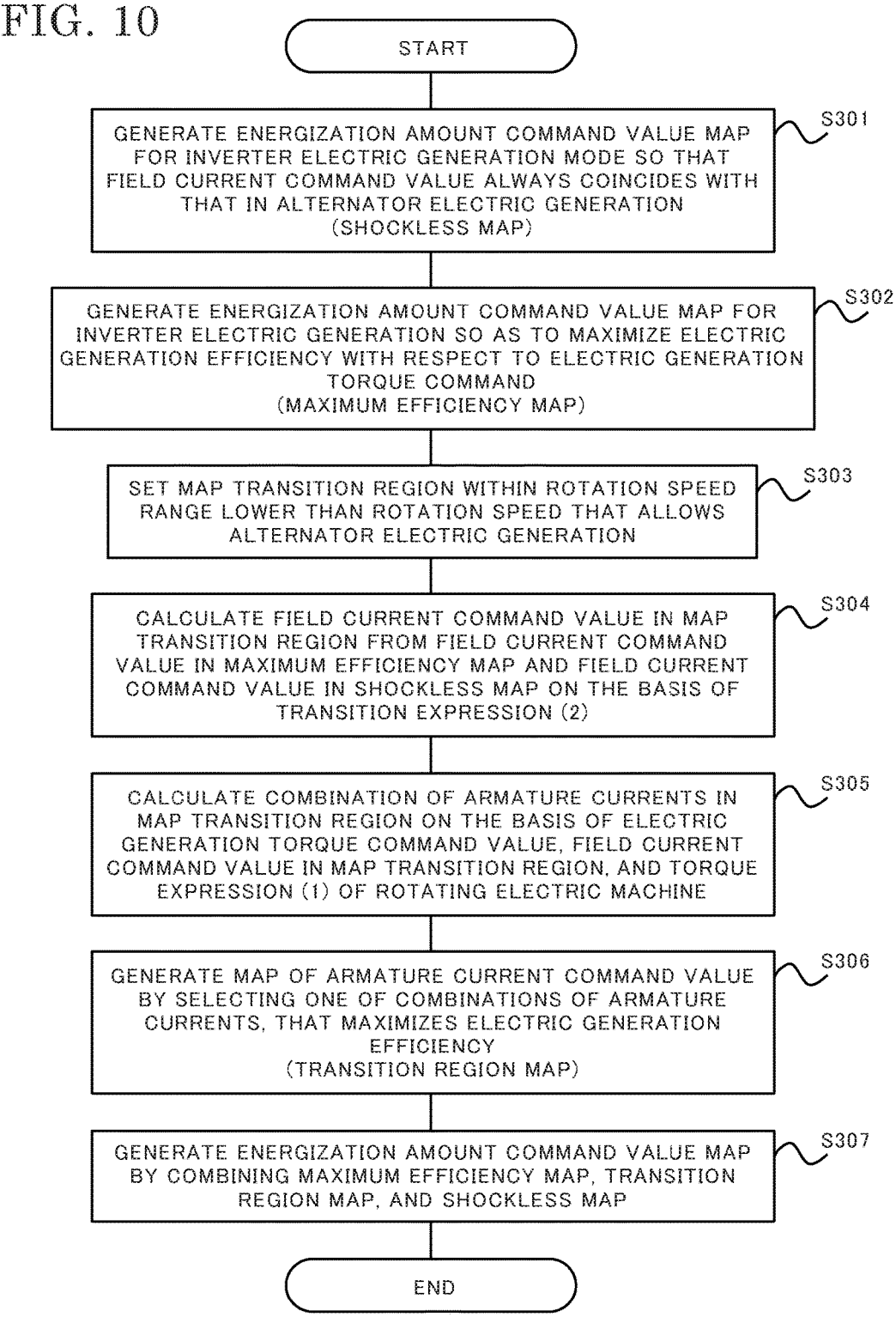
FIG. 10 is a flowchart showing a procedure for generating a field current command value and an armature current command value according to embodiment 3 of the present invention.

FIG. 10 is a flowchart showing a procedure for generating the field energization amount command value Ifref1 and the armature energization amount command values Idref1 and Iqref1 to be stored in the first energization amount generating unit 311, in embodiment 3 of the present invention.

Figure 11:
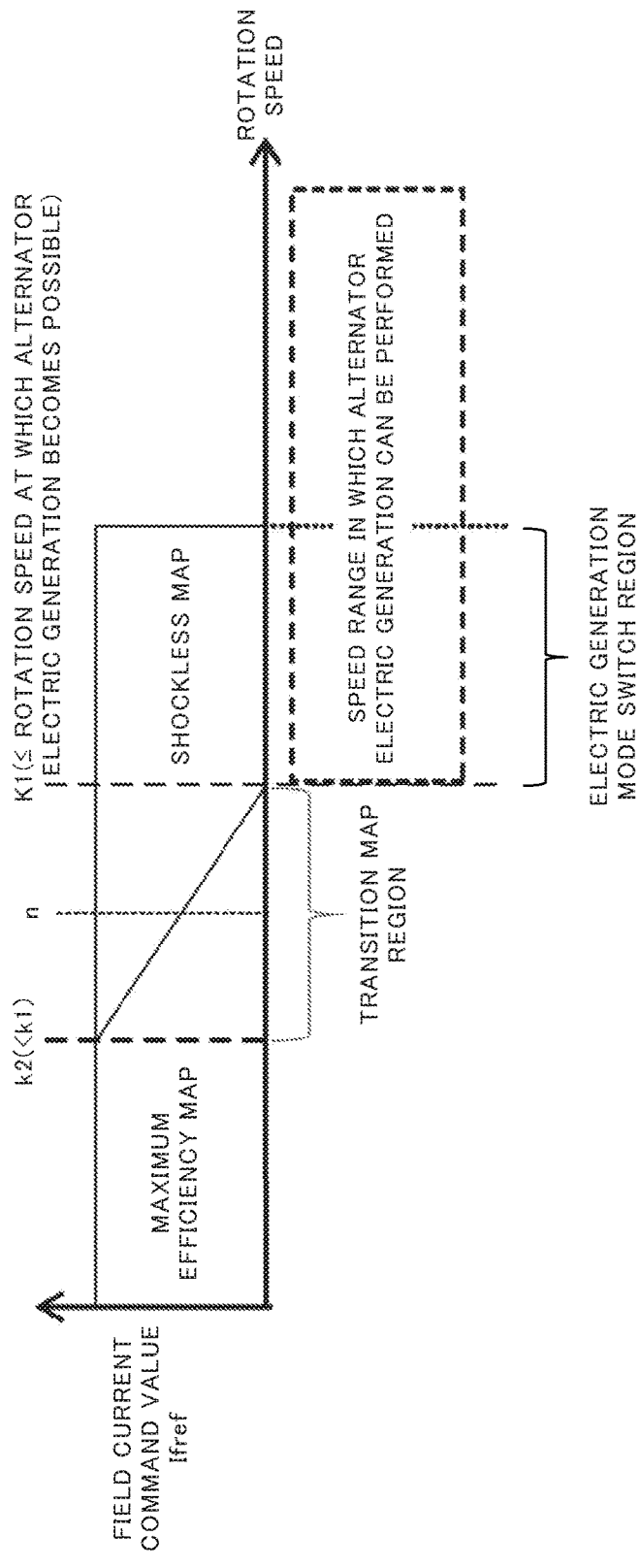
FIG. 11 is a schematic diagram showing a method for determining the field current command value during operation in the inverter electric generation mode according to embodiment 3 of the present invention.

FIG. 11 is a schematic diagram showing a method for determining the field energization amount command value Ifref during operation in the inverter electric generation mode, in the present embodiment 3. Hereinafter, with reference to FIG. 10 and FIG. 11, the procedure for generating the energization amount command value map in embodiment 3 will be described.

First, through the same procedure as in embodiment 1, an energization amount command value map for the inverter electric generation mode is generated in which the field energization amount command value Ifref is prescribed so as to always coincide with that for the alternator electric generation mode. In the present embodiment 3, this map is referred to as a shockless map (step S301).

Next, on the basis of expression (1) for torque of a rotating electric machine, such a combination of the field energization amount command value Ifref and the armature energization amount command values Idref and Iqref as to maximize the electric generation efficiency with respect to the electric generation torque command value TRQref, is derived, thereby generating an energization amount command value map for inverter electric generation. This map is referred to as a maximum efficiency map (step S302).

Next, during operation in the alternator electric generation mode, on the basis of the relationship between induced voltage that can be generated by the rotating electric machine and the rotation speed of the rotating electric machine, k1 is determined as a lower rotation speed than the rotation speed of the rotating electric machine at which operation in the alternator electric generation mode becomes possible.

Subsequently, k2 is set as a lower rotation speed than k1, and the interval therebetween is set as a map transition region (step S303).

Subsequently, from the field current command value (If–1) in the shockless map and the field current command value (If–2) in the maximum efficiency map, a field current command value (If–3) in the map transition region in FIG. 11 is determined on the basis of transition expression (2) shown below (step S304).

[Mathematical 2]

$$I_{f-3}(n) = \frac{1}{k1 - k2}\{(n - k2) \cdot I_{f-1}(n) + (k1 - n) \cdot I_{f-2}(n)\} \quad (2)$$

Here, n is the rotation speed of the rotating electric machine, and satisfies k2≤n≤k1. In addition, If(n) is a field current command value determined on the basis of each map when the rotation speed is n.

With respect to the relationship between the electric generation torque command value TRQref and the field current command value (If–3) in the map transition region determined by expression (2), combinations of the armature energization amount command values Idref and Iqref that satisfy the expression (1) for torque are determined (step S305).

Among these combinations, the armature current command values are determined so as to maximize the electric generation efficiency in the inverter electric generation (step S306). The resultant map is referred to as a transition region map.

Finally, in the range of rotation speed n<k2 and the range of rotation speed n>k1 which are not defined by the expression (2), the maximum efficiency map and the shockless map are used respectively. The three command values are combined in each rotation speed range, and the resultant map is determined as a new energization amount command value map for inverter electric generation (step S307).

Thus, by generating the energization amount command value map for inverter electric generation, the range in which inverter electric generation can be performed with the maximum efficiency is enlarged as compared to embodiment 1, and the efficiency in the inverter electric generation mode can be increased.

According to the present embodiment 3, at the time of switching between the alternator electric generation mode and the inverter electric generation mode, the same control as in embodiment 1 is performed, whereby torque shock and current pulsation due to switching of the electric generation mode can be suppressed, and in addition, when the speed is low, operation can be performed with the maximum efficiency in the inverter electric generation, whereby the efficiency in inverter electric generation can be improved. Further, in the present embodiment 3, in the speed region corresponding to transition between the maximum efficiency map and the shockless map, the field energization amount command value Ifref is prescribed so that the field current If smoothly varies. Therefore, torque variation due to variation in the rotation speed during inverter electric generation does not occur.

In embodiments 1 to 3 of the present invention described above, the description has been given under the assumption that the speed of response to variation in the command value for the field current If is slow. However, in the case where the speed of response to variation in the command values for the armature currents Id and Iq is slow, another current command value may be controlled so as not to vary the command values for the armature currents Id and Iq.

In the above embodiments, the field energization amount command values before and after switching of the electric generation mode are caused to coincide with each other. However, actually, even if the command values do not perfectly coincide with each other, by performing control so as to reduce the difference therebetween as much as possible, torque variation between before and after switching of the electric generation mode can be suppressed.

It is noted that, within the scope of the present invention, the above embodiments may be freely combined with each other, or each of the above embodiments may be modified or simplified as appropriate.

DESCRIPTION OF THE REFERENCE CHARACTERS 101 internal combustion engine for vehicle
102 electric generator motor
103 battery
104 power transmission unit
200 rotating electric machine
201 armature winding
202 field winding
203 rotational position sensor
210 energization control device
220 bridge circuit
223a to 223c upper-arm switching element
224a to 224c lower-arm switching element
225a to 225c upper-arm diode
226a to 226c lower-arm diode
227a to 227c armature current sensor
230 field circuit
231, 232 field circuit switching element
233 field current sensor
301 B terminal voltage detection unit
302 rotation speed calculation unit
303 armature current detection unit
304 field current detection unit
305 electric generation switch signal generating unit
310 energization amount generating unit
311 first energization amount generating unit
312 second energization amount generating unit
313 third energization amount generating unit
320 energization signal generating unit
321 electric generation switch unit
322 armature energization signal generating unit
323 field energization signal generating unit
330 external input terminal

The invention claimed is:

1. A control device for a rotating electric machine that controls the rotating electric machine as a charging electric generator, using an inverter circuit, the control device comprising:
an energization amount generator to generate an energization amount command value for a field winding and an energization amount command value for an armature winding of the rotating electric machine in a first electric generation mode in which an energization amount for the field winding and an energization amount for the armature winding are controlled and the inverter circuit is driven to perform an electric generation, and to generate an energization amount command value for the field winding in a second electric generation mode in which only an energization amount for the field winding is controlled to perform the electric generation; and
an energization signal generator to perform switching between the first electric generation mode and the second electric generation mode based on first variation-related information relevant to variation in at least one of an electric generation torque and an electric generation current of the rotating electric machine, and to generate energization signals for the field winding and the armature winding.

2. The control device for the rotating electric machine according to claim 1, wherein the first variation-related information is a speed of response to variation of at least one of current or voltage of the armature winding or the field winding.

3. The control device for the rotating electric machine according to claim 2, wherein the first variation-related information is whether the speed of response to variation of at least one of the current or the voltage of the armature winding or the field winding is relatively slow or relatively fast.

4. The control device for the rotating electric machine according to claim 3, wherein, in switching between the first electric generation mode and the second electric generation mode, the energization signal is generated to minimize a difference, between a time before the switching and a time after the switching, in at least one of the current or the voltage of the field winding or the armature winding of which the speed of response is slower.

5. The control device for the rotating electric machine according to claims 1, wherein the energization amount generator includes:
a first energization amount generator to generate the energization amount command value for the armature winding and the energization amount command value for the field winding according to the electric generation torque or the electric generation current in the first electric generation mode; and
a second energization amount generator to generate the energization amount command value for the field winding according to the electric generation torque or the electric generation current in the second electric generation mode.

6. The control device for the rotating electric machine according to claim 5, wherein the energization amount generator minimizes a difference between the energization amount command value for the field winding outputted from the first energization amount generator, and the energization amount command value for the field winding in the second energization amount generator.

7. The control device for the rotating electric machine according to claim 5, wherein the energization amount generator further includes a third energization amount generator to generate the energization amount command value of the field winding and the armature winding so as to maximize an efficiency of the electric generation in the first electric generation mode, and
the energization signal generator performs switching between the first energization amount generator and the third energization amount generator in the first electric generation mode.

8. The control device for the rotating electric machine according to claim 7, wherein
in the first electric generation mode, the energization signal generator performs the switching by changing a ratio between the energization amount command values of the first energization amount generator and the third energization amount generator on the basis of a rotation speed of the rotating electric machine.

9. The control device for the rotating electric machine according to claim 8, wherein the ratio between the energization amount command values of the first energization amount generator and the third energization amount generator is changed by using a low pass filter.

10. The control device for the rotating electric machine according to claim 5, wherein each of the first energization amount generator and the second energization amount generator includes a map, and
   the map of the first energization amount generator is prescribed so as to minimize a difference between the energization amount command value for the field winding outputted from the map of the first energization amount generator, and the energization amount command value for the field winding outputted from the map of the second energization amount generator.

11. The control device for the rotating electric machine according to claim 5, wherein the map of the first energization amount generator is composed of:
   a map for a first energization amount command value, prescribed so as to generate the energization amount command value for the field winding such that a difference from the energization amount command value for the field winding in the map of the second energization amount generator is minimized;
   a map for a second energization amount command value, prescribed so as to maximize an efficiency of the electric generation in the first electric generation mode; and
   a map for a third energization amount command value, generated by changing an output ratio so as to gradually switching between the first energization amount command value and the second energization amount command value in accordance with second variation-related information.

12. The control device for the rotating electric machine according to claim 11, wherein the second variation-related information is a rotation speed of the rotating electric machine.

* * * * *